Figure 1:
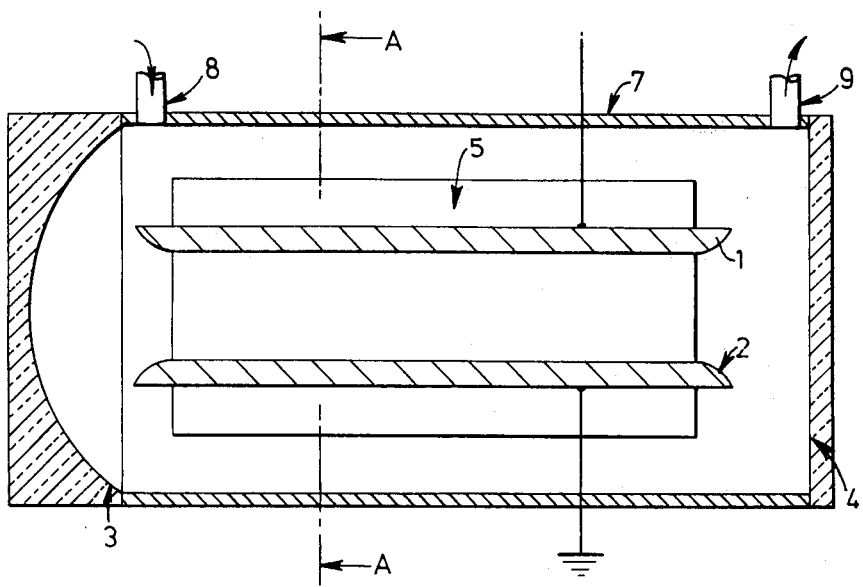

United States Patent [19]

Rickwood

[11] 4,387,463
[45] Jun. 7, 1983

[54] ELECTRICAL DISCHARGE APPARATUS AND A GAS LASER PUMPED BY AN ELECTRICAL DISCHARGE THROUGH THE GAS

[76] Inventor: Kenneth R. Rickwood, 28, King Harold Rd., Colchester CO4 3SQ, Essex, England

[21] Appl. No.: 193,277

[22] PCT Filed: Oct. 19, 1979

[86] PCT No.: PCT/GB79/00168
§ 371 Date: Jun. 20, 1980
§ 102(e) Date: Jun. 17, 1980

[87] PCT Pub. No.: WO80/00898
PCT Pub. Date: May 1, 1980

[30] Foreign Application Priority Data

Oct. 20, 1978 [GB] United Kingdom ............... 41376/78

[51] Int. Cl.³ .............................................. H01S 3/09
[52] U.S. Cl. .................................................... 372/86
[58] Field of Search ....................... 372/83, 86, 85, 87

[56] References Cited

U.S. PATENT DOCUMENTS 4,085,386  4/1978  Farish et al. .......................... 372/86

FOREIGN PATENT DOCUMENTS 759857  2/1954  Fed. Rep. of Germany .
905283  3/1954  Fed. Rep. of Germany .
757022  9/1956  United Kingdom .

OTHER PUBLICATIONS

Burnett et al., "Simple Electrode Configuration for UV Initiated High-Power TEA Laser Discharges", *J. of Appl. Phys.*, vol. 44, No. 8, Aug. 1973, pp. 3617–3618.
Belanger et al., "Atmospheric Pressure $CO_2$ Pulsed Laser with Semiconducting Plastic Electrodes", *Canadian Journal of Physics*, vol. 50, No. 22, Nov. 15, 1972, pp. 2753–2755.

*Primary Examiner*—James W. Davie
*Attorney, Agent, or Firm*—Cushman, Darby & Cushman

[57] ABSTRACT

In electrical discharge apparatus, such as a gas laser, in which a glow discharge is to be produced in a gas between two electrodes, at least one pre-ionizing member is placed near the discharge space and extending between the electrodes so that current flows in the member which is made of intermediate resistivity material such as crystalline semiconductor material. As a result, the discharge space is pre-ionized which assists initiation of the main discharge. The pre-ionization may be due to the formation of numerous small arcs between the electrodes and the member and the resulting production of ultra-violet light.

10 Claims, 8 Drawing Figures

ELECTRICAL DISCHARGE APPARATUS AND A GAS LASER PUMPED BY AN ELECTRICAL DISCHARGE THROUGH THE GAS

This invention relates to electrical discharge apparatus in which a glow discharge is produced within a gas between two electrodes. More particularly, but not exclusively, it relates to a gas laser in which the laser is pumped or excited by means of such a discharge.

Such apparatus may be provided with a pre-ionising system to provide a high background concentration of electrons before the main discharge is initiated. This facilitates the initiation of the main discharge and enables a larger amount of energy to be put into the discharge without production of an arc between the discharge electrodes. One pre-ionising system known in relation to gas lasers utilises a trigger wire which gives rise to pre-ionisation by electrostatic emission. In another such known system, small sparks are introduced into the volume of gas and ultra-violet radiation from these sparks gives rise to the pre-ionisation. Each of the above known systems suffers respective disadvantages which may be more or less important, dependent upon the application and it is one object of this invention to provide an alternative pre-ionising arrangement for a gas laser, which alternative may be more advantageous than the known ones for some applications. A further object is to provide a simple, rugged and low cost pre-ionising system for a gas laser or other gas discharge device to improve the efficiency of the discharge therein.

According to one aspect of the invention, there is provided electrical discharge apparatus comprising first and second electrodes for passing an electrical discharge through gas in a discharge space between the electrodes and a pre-ionising member which is made of intermediate resistivity material and which is positioned at least near said space such that the application of a discharge potential between the electrodes results in a current flow within the member and pre-ionisation of said gas.

According to a second aspect of the invention, there is provided gas laser apparatus comprising an optical cavity first and second electrodes for producing an electrical discharge through the gas in a discharge space between the electrodes to excite the laser and at least one pre-ionising member which is made of intermediate resistivity material and which is positioned at least near said space such that the application of a discharge potential between the electrodes results in a current flow within the member and pre-ionisation of said gas.

Advantageously, the apparatus includes a least one further pre-ionising member made of intermediate resistivity material, the pre-ionising members extending along respective sides of said space.

Preferably a portion of the or each pre-ionising member is at least substantially adjacent to the first electrode and the member extends alongside said space towards the second electrode. Even more preferably, respective portions of the or each pre-ionising member are at least substantially adjacent to the two electrodes or, better still, the or each pre-ionising member is in physical contact with at least one of the electrodes. Advantageously, the or each pre-ionising member extends in the direction transverse to that between the electrodes, along at least the major part of the extent, in this transverse direction, of the electrodes.

Throughout this specification, the term "intermediate resistivity material" means material which is neither a dielectric nor a good metallic conductor and includes for example, materials such as crystalline semiconductors, and carbon and carbon compositions of the kind used for making resistors. The suitability of particular materials and the usable range of resistivities can be easily determined by experimentation since, if the resistivity is too low or too high, the pre-ionising effect will become degraded or will disappear altogether. Further information concerning the choice of suitable materials is given later in this specification.

Preferably, the resistivity of the material is at least 50 ohm. cm. Further, although as stated, other materials such as carbon and carbon compositions may be used, the best results so far have been obtained with the above-mentioned crystalline semiconductor materials, e.g. silicon and germanium.

Figure 2:
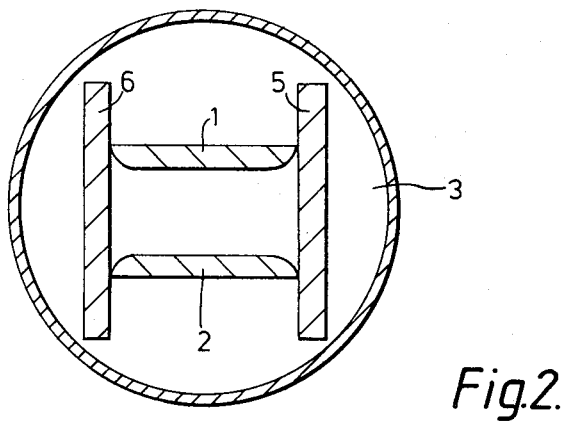

For a better understanding of the invention and to show how the same may be carried into effect, reference will now be made, by way of example, to the accompanying drawings, in which:

FIG. 1 is a diagrammatic cross-sectional view of the optical cavity of a transversely excited gas laser, FIG. 2 is a section on the line AA of FIG. 1 and, FIGS. 3(a), 3(b), 3(c), 3(d), 3(e) and 3(f) show several examples of possible positions of a pre-ionising member used in the laser of FIG. 1.

Referring to FIGS. 1 and 2, the laser comprises a chamber having a gas inlet 8 for receiving the laser gas, for example a mixture of carbon dioxide, nitrogen and helium in the respective proportions 10:10:80, and a gas outlet 9. Within the chamber are two electrodes 1 and 2. The electrodes may be made of brass or other suitable metal and they preferably have edges profiled to give a uniform field distribution between them. For example, the edges may be radiussed as shown or they may be given what is known in the art as a Rogowski profile or an approximation thereof. A 98% reflecting concave mirror 3 and an 80%—reflecting plane mirror 4 are positioned at respective ends of the chamber to define an optical cavity between them. During use of the laser, the gas mixture is flowed through the chamber 7 substantially at atmospheric pressure and discharge pulses are applied to the electrodes from a conventional discharge circuit (not shown) to produce a glow discharge through the gas between the electrodes. The discharge is thus transverse to the direction (i.e. between the mirrors) of the laser beam axis—hence the description of the laser apparatus as "transversely excited". At opposite sides of the discharge space between the electrodes are respective pre-ionising members 5 and 6 which extend between the electrodes and are in contact with each of them. The pre-ionising members are made of material having intermediate resistivity, that is to say, they are neither good conductors nor are they good insulators. When a voltage pulse is applied between the electrodes, the presence of the members 5 and 6 results in the production of a high background concentration of electrons within the space between the electrodes and this pre-ionisation assists in the initiation of a glow discharge between the electrodes. The effect appears to be due to the formation of numerous small electrical arcs between the electrodes and the members, which arcs produce ultra-violet radiation which, in turn, produces the pre-ionising effect. Thus, the resistivity of the material of which the members 5 and 6 are made should be sufficiently low to ensure that the arc forming current can flow but not so low that the arcs become self-maintaining or cease to be well distributed throughout the length of each area of contact between the electrodes and the members (i.e. if the material is a good conductor, the arcs may become concentrated into only a few widely spaced, strong arcs with resultant degradation of the uniformity of the pre-ionising effect). It is preferred that the resistivity should be at least about 50 ohms.cm. since, below this, too much of the discharge energy flows through the members and is wasted. Also, it is thought that some materials having resistivities above about 750 ohm.cm. or so may exhibit odd non-linear effects such as surface-tracking. However, it may be found that some materials having resistivities outside the range 50 to 750 ohms.cm, particularly above it, may be usable and may be advantageous from the cost point of view even if they are not so efficient.

Purely by way of example, a laser constructed as shown might have electrodes of area about 150 mm. by 10 mm. with a distance of about 5 mm. between them, an optical cavity length of about 220 mm. and pre-ionising members made of 200 ohm.cm. p-type silicon and about 1.5. mm. thick. Such a laser might be provided with an input energy density of about 90 joules/liter and have an efficiency of about 8%.

Other crystalline semiconductors may be used for the members 5 and 6, for example 50 ohm.cm. polycrystalline germanium and 100 ohm.cm. p-type silicon have been tested successfully. Also, materials other than such crystalline semiconductors may be used, for example carbon and carbon compositions.

The laser described and illustrated does not comprise any electrostatic trigger wire or a double discharge system for introducing sparks into the volume of gas.

Only one semiconductor pre-ionising member need be employed and it may be shorter in length than the electrodes, but the shorter the length the shorter the discharge. Under some conditions, it might be possible to turn this effect to advantage as follows. It is preferred that the edges of those portions of the electrodes between which discharge occurs and between which, therefore, laser action occurs should be profiled as described earlier. If discharge occurs throughout the length of the electrodes, the ends thereof should be profiled as well as the sides and this may be reflected in the cost of machining the electrodes particularly as regards the corners where the side and end profiles meet. If the pre-ionising member(s) is or are made somewhat shorter than the electrodes, discharge may not occur at the ends thereof, in which case these ends need not be profiled, i.e. the electrodes could have the same cross-section throughout. This may reduce the production cost of the laser.

Referring now to FIG. 3, possible positions of a pre-ionising member M relative to the electrodes are shown, by way of example only. As shown in 3(a) and 3(b) the pre-ionising member M may be in contact with both the electrodes 1, 2. In 3(c) the pre-ionising member M is shown spaced from both electrodes, the spacing for a laser as described above would be up to approximately 1 mm, preferably about 0.5 mm. or less, and 3(d) shows the pre-ionising member M in contact with the lower electrode 2 but leaving a gap between itself and the upper electrode 1. This gap may be approximately 2–3 mm.

Figures 3A, 3B, 3C, 3D:
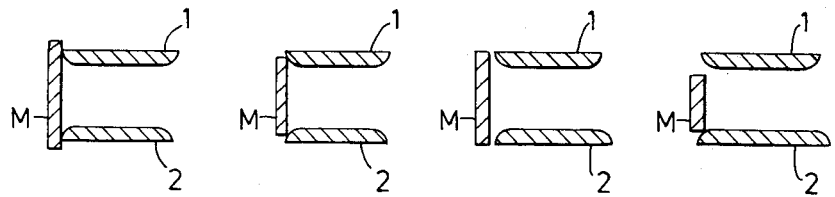
Figure 3E:
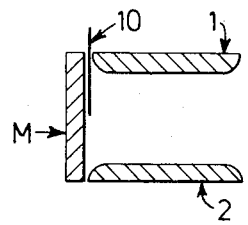

The pre-ionising member may be capacitatively coupled to one of the electrodes, for example a sheet or layer of dielectric material 10 may be interposed between the member M and the electrode 1 as shown in FIG. 3(e).

Figure 3F:
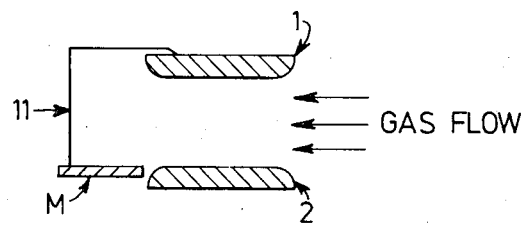

As shown in FIG. 3(f), the member M lies in the same plane as the electrode 2 and a piece of wire 11 or other metallic conductor member is connected between the member M and the electrode 1. The electrode 2 in FIG. 3(f) might be about 5 mm. thick and the member M about 2 mm. thick. FIG. 3(f) demonstrates a further possible modification which is facilitated by the fact that the member M in this case lies in the same plane as the electrode 2 and hence does not obstruct the side of the space between the electrodes. This further possible modification consists in arranging the laser so that the laser gas flows through the discharge space transversely to the laser axis. This may give a better cooling effect and may hence allow an increase in the repetition frequency of the discharge pulses applied to the electrodes.

In FIGS. 3(a) to 3(e), there could, of course, be two pre-ionising members, one at each side of the electrodes. In FIG. 3(f), there could be up to four members M, one at each side edge of each electrode.

As well as a gas laser, the pre-ionising members of this invention may be provided in other electrical discharge apparatus, for example in discharge lamps and gas discharge devices used as switches.

We claim:
1. Pulsed discharge gas laser apparatus comprising:
an optical cavity;
first and second spaced main discharge electrodes, respectively mounted adjacent said cavity and defining therebetween an electrical discharge space, through which passes the optical axis of the cavity;
pulse signal supply means connected to and operable for supplying to said electrodes electrical pulse signals for producing main laser-exciting discharges through gas in said discharge space; and
pre-ionising means, mounted adjacent said space, for producing initial discharges which photo-ionise said gas and facilitate initiation of said main discharges, said pre-ionising means comprising at least one pre-ionising discharge electrode member which has a surface portion extending adjacent said discharge space in the general direction of said optical axis, and which is made of material having a resistivity intermediate that of a dielectric and a good metallic conductor and is arranged so that a portion of each pulse signal supplied by said pulse signal supply means is passed as a current flow through the member and there is produced, for each main discharge, an initial photo-ionising discharge substantially evenly distributed along said surface portion of the member and correspondingly a gas pre-ionising effect which is substantially uniform along the optical axis direction of the discharge space.

2. Apparatus according to claim 1 wherein said surface portion of said pre-ionising member is one of substantially adjacent to and in physical contact with the first main discharge electrode and the member is coupled to the second main discharge electrode, said initial discharge taking place between said surface portion of the member and said first main discharge electrode.

3. Apparatus according to claim 2, wherein respective surface portions of said pre-ionising member are one of substantially adjacent to and in contact with respective ones of both said main discharge electrodes whereby a further distributed pre-ionising discharge occurs between the pre-ionising member and the second main discharge electrode.

4. Apparatus according to claim 2, wherein the pre-ionising member is capacitively coupled to the second main discharge electrode.

5. Apparatus according to claim 4, further comprising a sheet of dielectric material interposed between said pre-ionising member and said second main electrode to provide said capacitive coupling.

6. Apparatus according to claim 2, wherein the pre-ionising member lies alongside said first main discharge electrode so as to leave substantially unobstructed each side of said discharge space for gas to be able to flow through that space transversely, said apparatus further comprising electrical conductor means for coupling the pre-ionising member to the second main discharge electrode.

7. Apparatus according to claim 1 wherein said surface portion of said pre-ionising member extends along at least the major part of the length of said discharge space in the direction along said optical axis.

8. Apparatus according to claim 1, wherein the pre-ionising member is made of crystalline semi-conductor material.

9. Apparatus according to claim 1, including at least one further pre-ionising discharge electrode member, the pre-ionising members being positioned at respective sides of said space.

10. Apparatus according to claim 1, 2, 3, 4, 5, 6, 7, 8 or 9 wherein said pre-ionising discharge electrode member has a resistivity substantially in the range of 50 to 750 ohm cm.

* * * * *